United States Patent
Maruyama et al.

[11] Patent Number: 6,145,907
[45] Date of Patent: Nov. 14, 2000

[54] FLOOR STRUCTURE OF AN AUTOMOBILE

[75] Inventors: Kazuhiko Maruyama; Yasuyuki Shibata; Gary Evert, all of Wako, Japan

[73] Assignee: Honda Giken Kogyo Kabushiki Kaisha, Tokyo, Japan

[21] Appl. No.: 09/163,126

[22] Filed: Sep. 29, 1998

[30]  Foreign Application Priority Data

Oct. 1, 1997  [JP]  Japan ................................... 9-268338

[51] Int. Cl.⁷ ...................................................... B60R 7/06
[52] U.S. Cl. ........................................ 296/37.14; 296/37.2
[58] Field of Search ............................... 296/37.2, 37.14, 296/37.15, 37.3, 66, 37.16, 37.8; 224/297

[56]  References Cited

U.S. PATENT DOCUMENTS

| | | | |
|---|---|---|---|
| 1,597,569 | 3/1926 | Barringer .............................. | 296/37.14 |
| 4,226,461 | 10/1980 | Ackel ................................... | 296/37.14 |
| 5,061,002 | 10/1991 | Saso ...................................... | 296/37.3 |
| 5,178,434 | 1/1993 | Krebs .................................... | 296/37.3 |
| 5,195,795 | 3/1993 | Cannera et al. ....................... | 296/66 X |
| 5,257,846 | 11/1993 | Kannai et al. ........................ | 296/37.14 |
| 5,599,054 | 2/1997 | Butz et al. ............................. | 296/37.8 |

FOREIGN PATENT DOCUMENTS

| | | | |
|---|---|---|---|
| 2687629 | 8/1993 | France | ................................... 296/37.2 |
| 6179381 | 6/1994 | Japan . | |

*Primary Examiner*—Joseph D. Pape
*Attorney, Agent, or Firm*—Carrier, Blackman & Associates, P.C.; Joseph P. Carrier; William D. Blackman

[57]  ABSTRACT

An upper cross member and a lower cross member are formed integrally together to include a cross member having the shape of a box in cross section, and to the front and rear sides thereof are joined floor panels of an automobile. A trunk room or storage space is formed between right and left side frames to which are joined both ends of the cross member. A lid for opening and closing an opening located in space between a front seat and a center seat of the automobile is pivotally supported by the cross member that forms a portion of the upper wall of the trunk room. The lid is normally locked to the floor panel by a locking mechanism having a grip. The lid when opened is maintained at its open position by anchoring a hook attached to an end of a wire to an engaging portion provided at the back of the front seat. Thus, the trunk room is formed under the lower surfaces of the floor panels, enabling a spare tire or other articles to be easily put therein or taken out therefrom, yet maintaining rigidity of the car body.

18 Claims, 5 Drawing Sheets

FLOOR STRUCTURE OF AN AUTOMOBILE

BACKGROUND OF THE INVENTION

1. Field of the Invention

The present invention relates to a floor structure of an automobile equipped with a trunk room or storage space under a lower surface of a floor panel.

2. Description of the Related Art

Japanese Patent Application Laid-Open (Kokai) No. 6-179381 discloses a structure in which a trunk room or storage space for accommodating a spare tire is formed under a lower surface of a floor panel located under a front seat of an automobile, and the front seat may be selectively tilted backward to open an upper surface of the trunk room so that the spare tire can be placed therein or can be taken out therefrom.

According to the above-mentioned known structure, however, the right and left side frames of the automobile are terminated at a position of the trunk room, and the car body may lack a desired degree of rigidity. If the thicknesses of the right and left side sills of the car body are increased to compensate for this defect, then, there arises a problem; i.e., an increase in the weight of the car body. To put the spare tire into, or to take it out from, the trunk room, furthermore, the whole seat must be tilted backward requiring a cumbersome operation and causing the structure of the seat to become complex.

SUMMARY OF THE INVENTION

The present invention was accomplished in view of the above-mentioned circumstances, and its object is to form a trunk room under the lower surface of the floor panel such that it enables articles to be easily placed therein or to be easily taken out therefrom, yet maintaining rigidity of the car body.

In order to accomplish the above-mentioned object according to a first feature of the present invention, there is provided a floor structure of an automobile in which a trunk room is provided under a lower surface of a floor panel, and a lid is provided on the floor panel for opening and closing an opening of the trunk room, wherein the trunk room is disposed between a pair of right and left side frames arranged along the lower surface of the floor panel in a longitudinal direction of the car body, and the lid is disposed between a front seat and a rear seat supported on an upper surface of the floor panel.

According to such structure according to the invention, the trunk room is formed between the pair of right and left side frames arranged along the lower surface of the floor panel in the longitudinal direction of the car body. Therefore, the side frames are not terminated by the trunk room, and the rigidity of the car body is maintained. Besides, the lid for opening and closing the opening of the trunk room is disposed between the front seat and the rear seat, enabling the articles to be placed therein or taken out therefrom without the need of tilting the seat, thus improving the operability and simplifying the structure of the seat.

According to a second feature of the present invention, there is provided such a floor structure of an automobile, wherein a portion of an upper wall of the trunk room is formed by a cross member that extends in a lateral direction of the car body to connect the pair of right and left side frames together, in addition to the above-mentioned first feature.

According to the above-mentioned constitution, the side frames and the cross member reinforce each other to further enhance the rigidity of the car body and the rigidity of the trunk room.

According to a third feature of the present invention, there is provided such a floor structure of an automobile, wherein the lid is pivotally supported by the cross member, in addition to the above-mentioned second feature.

According to the above-mentioned constitution, the cross member is utilized for supporting the lid, and no additional support member is required, thus decreasing the number of parts of the floor structure including the trunk room.

According to a fourth feature of the present invention, there is provided such a floor structure of an automobile, wherein the cross member is a closed cross-section obtained by joining together the front and rear flanges of an upper cross member having an open lower surface and the front and rear flanges of a lower cross member having an open upper surface. The rear edge of a front floor panel is joined to the front flanges of the upper cross member and of the lower cross member, and the front edge of a rear floor panel is joined to the rear flanges thereof, in addition to the above-mentioned second feature.

According to the above-mentioned constitution, the cross member having a closed cross section is formed by joining together the flanges of the upper and lower cross members. This contributes to not only increasing the rigidity of the cross member but also increasing the strength of junction of the cross member to the front and rear floor panels.

According to a fifth feature of the present invention, there is provided such a floor structure of an automobile, wherein the opening of the trunk room is formed rearwardly of the cross member, and the lower cross member is provided with an inclined surface that is gently inclined lower frontward from the front edge of said opening, in addition to the above-mentioned fourth feature.

According to the above-mentioned constitution, when the articles are to be placed in, or to be taken out, through the opening of the trunk room, the inclined surface formed in the lower cross member such that it is gently inclined lower frontward from the front edge of the opening, prevents interference between the articles and the cross member, and enables the articles to be easily placed in the trunk room or taken out therefrom.

According to a sixth feature of the present invention, there is provided such a floor structure of an automobile, wherein the front floor panel is provided with an inclined surface which is gently inclined upper rearward toward a vertex of said upper cross member, in addition to the above-mentioned fourth feature.

According to the above-mentioned constitution, a step formed between the upper cross member and the front floor panel is smoothed by the inclined surface of the front floor panel to prevent a foot of a passenger from being caught by the step.

According to a seventh feature of the present invention, there is provided such a floor structure of an automobile, wherein the upper cross member is provided with an inclined surface that is gently inclined upper frontward from the front edge of the opening toward a vertex of the inclined surface of the front floor panel, in addition to the above-mentioned sixth feature.

According to the above-mentioned constitution, the upper cross member can be smoothly connected to the front floor panel while maintaining the sectional area of the cross member.

According to an eighth feature of the present invention, there is provided such a floor structure of an automobile, wherein the upper surfaces of the front floor panel and of the cross member are covered with carpeting, in addition to the above-mentioned fourth feature.

According to the above-mentioned constitution, the connection portion between the upper cross member and the front floor panel is covered with carpeting to prevent a foot of a passenger from being caught on the connection portion.

According to a ninth feature of the present invention, there is provided such a floor structure of an automobile, .wherein the includes a lid body made of a steel plate, a peripheral edge of the lid body is bent to form a reinforced portion, and the reinforced portion is provided with a rubber cushion that comes in contact with a peripheral edge of the opening, in addition to the above-mentioned first feature.

According to the above-mentioned constitution, the rigidity of the lid body is enhanced by the reinforced portion formed by bending the peripheral edge, any shock occurring at the time when the lid is closed is lessened due to the rubber cushion provided with the reinforced portion, and preventing gap from being formed between the lid body and the rear floor panel.

According to a tenth feature of the present invention, there is provided such a floor structure of an automobile, wherein the upper surface of the lid and the upper surface of the floor panel are covered with carpeting, and a lower surface of an outer periphery of the carpeting extending toward an outer side beyond the outer periphery of the lid is secured, by a surface fastener, to an upper surface of the carpeting on the floor panel, in addition to the above-mentioned first feature.

According to the above-mentioned constitution, the carpeting on the lid and the carpeting on the floor panel are detachably fastened together while permitting the lid to be easily opened and closed, and the seam between the two carpets is prevented from being turned up to improve the appearance.

According to an eleventh feature of the present invention, there is provided such a floor structure of an automobile, wherein one end of the lid is pivotally supported relative to the floor panel, and the structure further includes a hook attached, via a wire, to another end of the lid opposite to the one end which is pivotally supported, and an engaging portion with which the hook engages is provided in a passenger compartment of the automobile, in addition to the above-mentioned first feature.

According to the above-mentioned constitution, the hook is engaged with an engaging portion to maintain the lid in an open state, facilitating the operation for putting the articles into the trunk room or taking them out therefrom.

According to a twelfth feature of the present invention, there is provided such a floor structure of an automobile, further including a grip for opening and closing the lid, the grip is accommodated in a recessed portion formed in the lid, in addition to the above-mentioned first feature.

According to the above-mentioned constitution, the lid can be easily opened and closed by holding the grip by hand and, besides, the grip is accommodated in the recessed portion when it is not in use, preventing passengers from inadvertently catching the grip at their feet and enhancing the appearance thereof.

According to a thirteenth feature of the present invention, there is provided such a floor structure of an automobile, wherein legs of the front seat are supported by the cross member, in addition to the above-mentioned second feature.

According to the above-mentioned constitution, the legs of the seat can be firmly supported by utilizing the cross member.

The above and other objects, features and advantages of the present invention will become obvious from the following detailed description of the preferred embodiment in conjunction with the accompanying drawings.

BRIEF DESCRIPTION OF THE DRAWINGS

FIGS. 1 to 5 illustrate the preferred embodiment of the present invention, wherein:

DETAILED DESCRIPTION OF THE PREFERRED EMBODIMENT

The preferred embodiment of the present invention will now be described with reference to the drawings.

Figure 1:
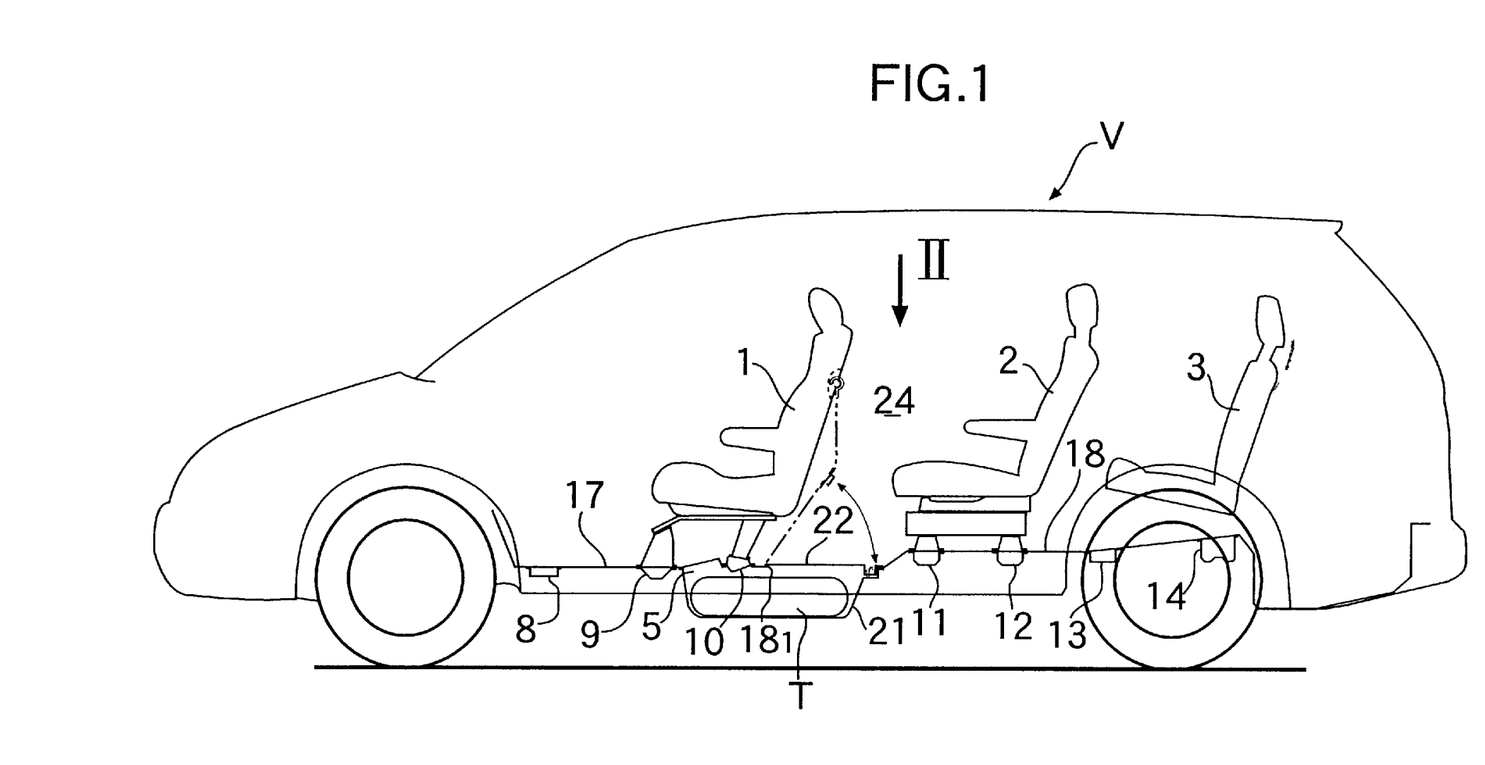
FIG. 1 is a side view illustrating a whole automobile.
Figure 2:
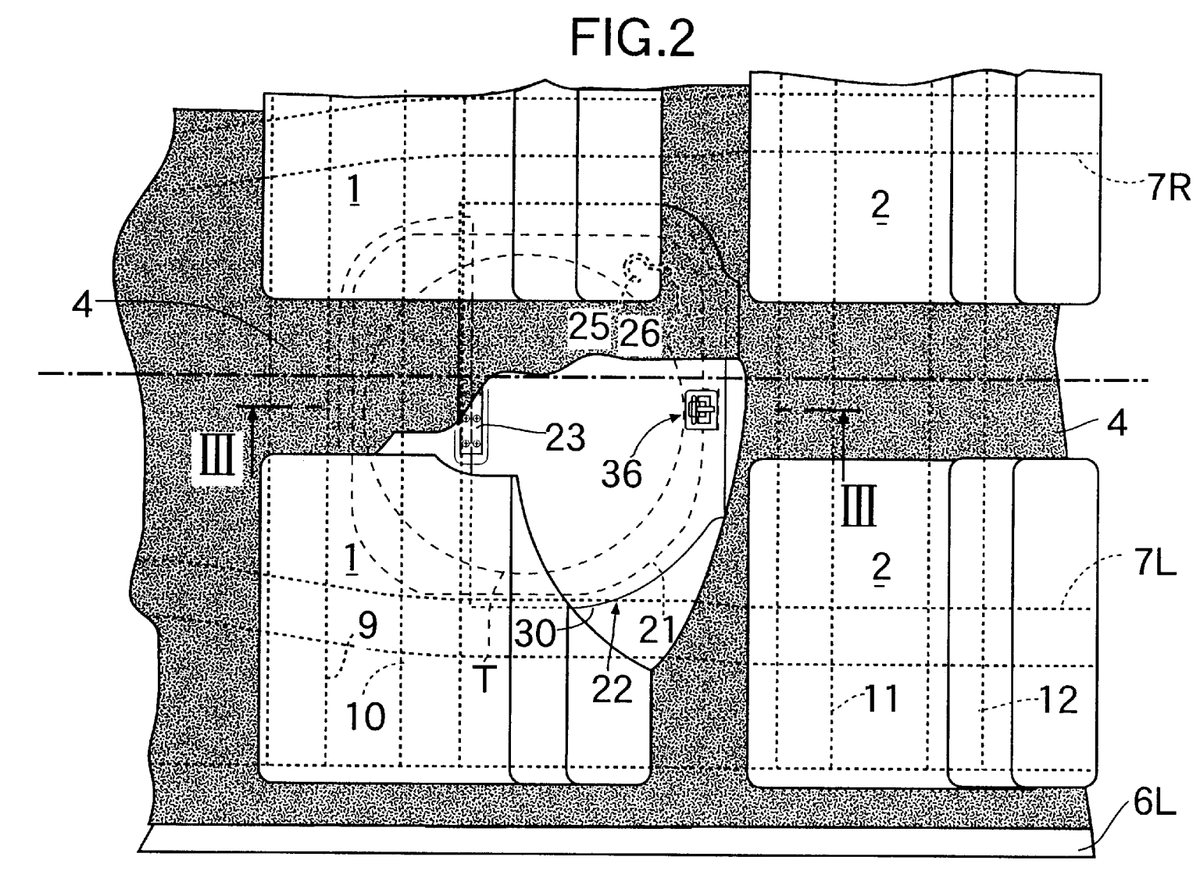
FIG. 2 is an enlarged plan diagram of the automobile in FIG. 1 when viewed from a direction of arrow II in FIG. 1.

Referring to FIGS. 1 and 2, a vehicle V is provided with front seats 1, 1, center seats 2, 2 and a rear seat 3. A walk-through passage 4 is provided between the right and left front seats 1, 1 and between the right and left center seats 2, 2, extending in the longitudinal direction of the car body. A trunk room or storage space 5 for accommodating a spare tire T is provided under the floor between the front seats 1, 1 constituting the seats of the front side and the center seats 2, 2 constituting the seats of the rear side.

The vehicle V is provided with a pair of right and left side sills arranged on both the right and left side portions of the car body extending in the longitudinal direction, the left side sill 6L is shown in FIG. 2, and a pair of right and left side frames 7R, 7L arranged on the inner sides of the right and left side sills and extending in the longitudinal direction. The right and left side sills and the right and left side frames 7R, 7L are connected by seven cross members 8 to 14 extending in the lateral direction. The cross members 8 to 14 traverse the right and left side frames 7R, 7L. The cross members 8 to 14 and the side frames 7R, 7L are coupled together at their intersecting points. Upon connecting the right and left side sills and the right and left side frames 7R, 7L by seven cross members 8 to 14, the rigidity of the car body is enhanced to a sufficient degree.

Figure 3:
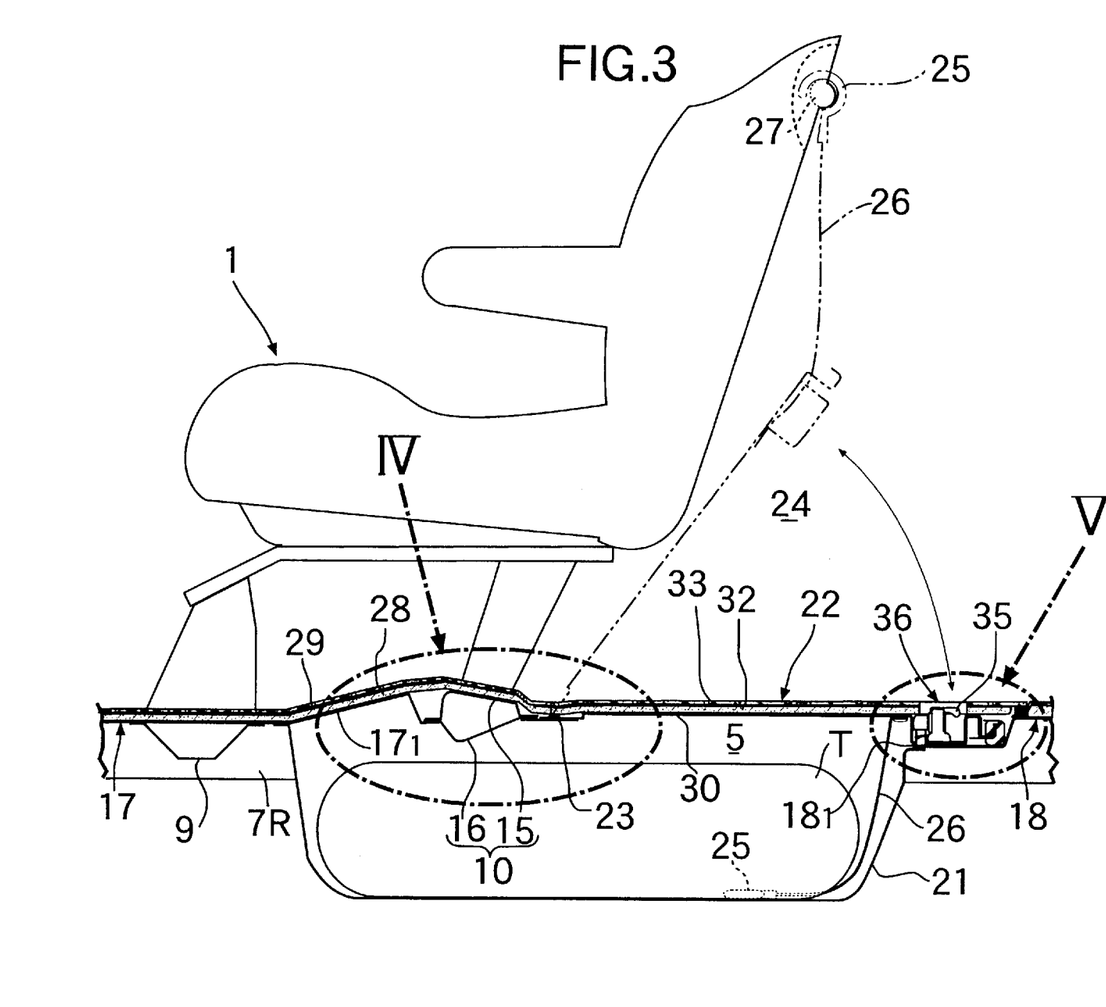
FIG. 3 is a sectional view along the line III—III in FIG. 2.
Figure 4:
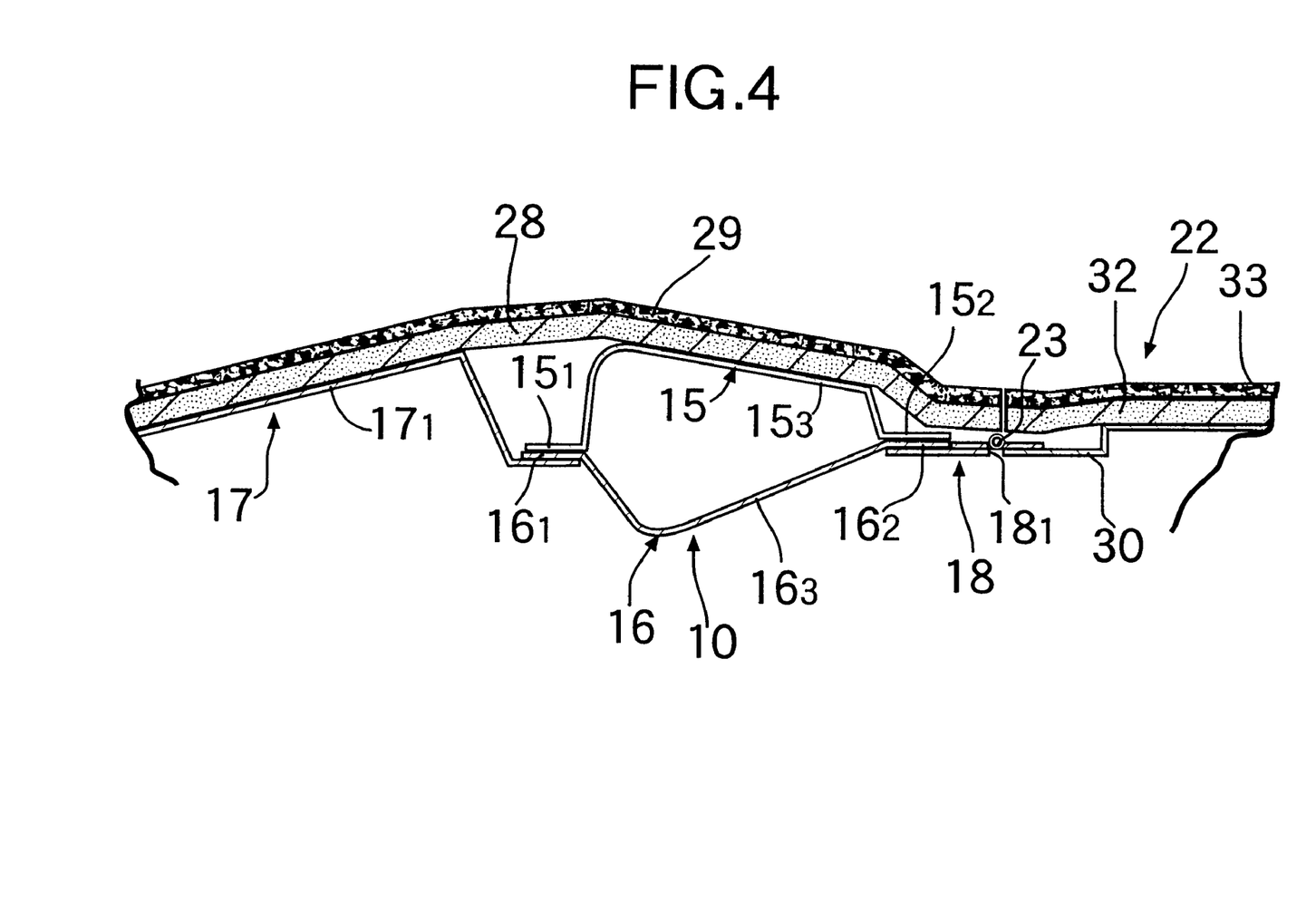
FIG. 4 is an enlarged view of an identified portion IV of FIG. 3.

As shown in FIGS. 3 and 4, the cross member 10 arranged under the front seats 1, 1 is formed by welding together flanges $15_1$, $15_2$ of a trough-shaped upper cross member 15 having an open lower surface and flanges $16_1$, $16_2$ of a trough-shaped lower cross member 16 having an open upper surface. The rear edge of a front floor panel 17 is welded, in an overlapped manner, to the lower surfaces of the front flanges $15_1$, $16_1$ that are overlapped one upon the other, and the front edge of a rear floor panel 18 is welded, in an overlapped manner, to the lower surfaces of the rear flanges $15_2$, $16_2$ that are overlapped one upon the other. The other six cross members 8, 9, and 11 to 14 are formed in the shape of a trough having open upper surfaces. Among them, two cross members 8 and 9 are welded to the lower surface of the front floor panel 17, and the remaining four cross members 11 to 14 are welded to the lower surface of the rear floor panel 18. The legs of the front seats 1, 1 are supported by the cross member 9 welded to the lower surface of the front floor panel 17 and by the cross member 10 welded to the lower surfaces of the front and rear floor panels 17, 18. The center seats 2, 2 are supported by the two cross members 11, 12 welded to the lower surface of the rear floor panel 18.

Due to a box-shaped structure formed by coupling the upper cross member 15 and the lower cross member 16 together, the cross member 10 exhibits an increased rigidity.

The trunk room 5 is located at a rear lower position of the front seats 1, 1 and includes a tray 21 for accommodating the spare tire T, a peripheral edge of the tray 21 being welded to the lower surfaces of the front floor panel 17 and of the rear floor panel 18. An opening $18_1$ is formed in the rear floor panel 18 permitting about two-thirds of the rear side of the tray 21 to communicate with the passenger compartment of the automobile. A lid 22 for opening and closing the opening $18_1$ of the trunk room 5 is pivotally supported at its front edge by the rear edge of the cross member 10 through a hinge 23. The opening $18_1$ faces space 24 on the front side of the center seats 2, 2. By opening a rear side door of the vehicle, therefore, the spare tire T can be easily put into, or taken out from, the trunk room 5 through the space 24. The lid 22 is pivotally supported by the cross member 10 without using any specially dedicated support member, and the number of parts can be decreased. Furthermore, the lid 22 is opened along the rear surface of the back of the front seats 1, 1 and, hence, the opening $18_1$ is widely exposed enabling the spare tire T to be more easily put therein or taken out therefrom.

A wire 26 equipped with a hook 25 is connected to the rear end of the lid 22. When the lid 22 is opened, therefore, the hook 25 may be easily anchored to an engaging portion 27 provided on the back of the front seats 1, 1; i.e., the lid 22 is maintained in an open position, so that the spare tire T can be put in the trunk room 5 or taken out therefrom highly efficiently. When not in use, the hook 25 and the wire 26 are contained in the trunk room 5.

Figure 5:
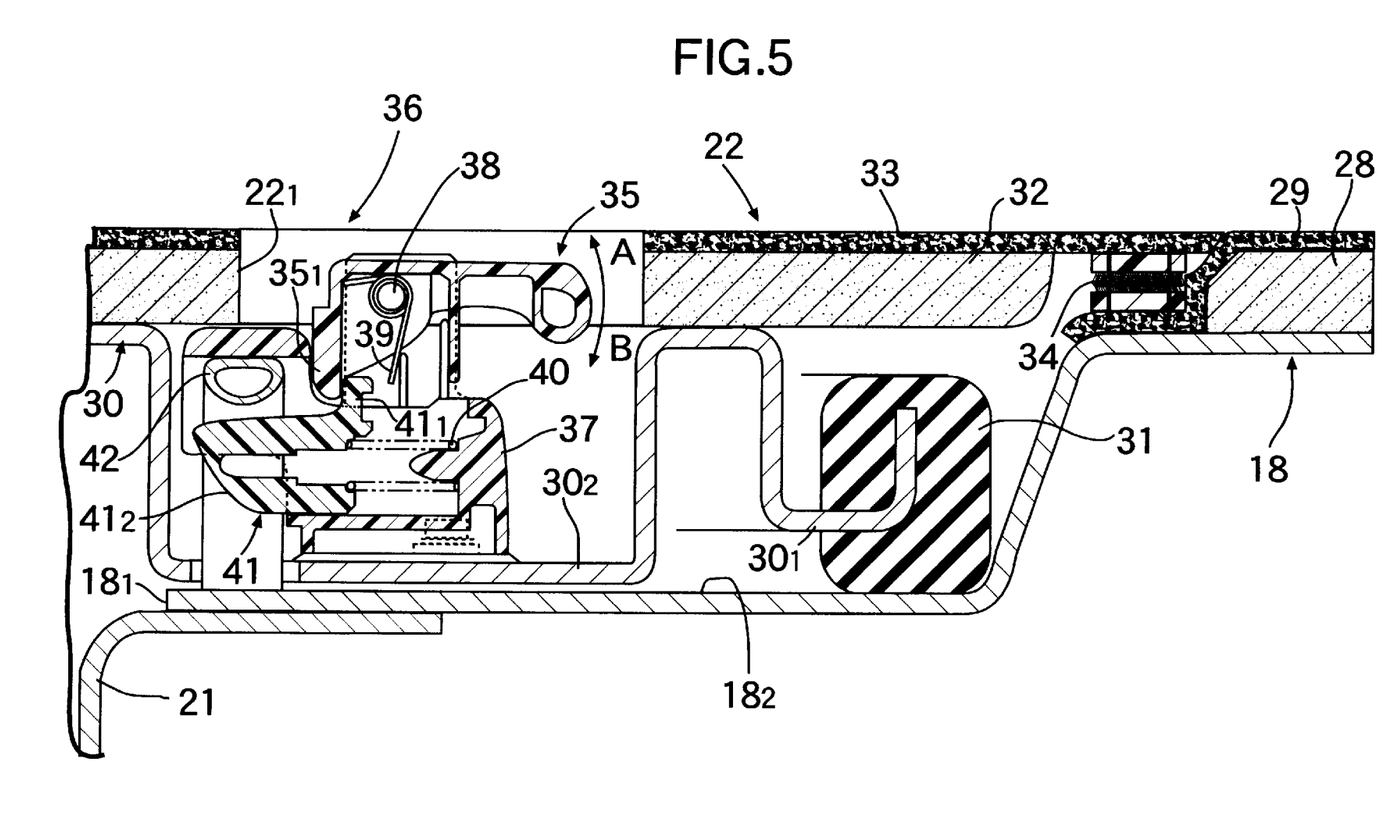
FIG. 5 is an enlarged view of an identified portion V of FIG. 3.

As shown in FIG. 5, a urethane resin cushion member 28 and a carpeting 29 are laminated in two layers on the upper surfaces of the front floor panel 17 and of the rear floor panel 18. A lid body 30 of the lid 22 is made of the same steel plate as that of the front floor panel 17 and the rear floor panel 18. A rubber cushion 31 provided at a reinforcing portion $30_1$ that is bent in a J-shape in cross section, is supported on the upper surface of a recessed portion $18_2$ formed along the peripheral edge of the opening $18_1$ in the rear floor panel 18. A urethane resin cushion member 32 and a carpeting 33 are laminated in two layers on the upper surface of the lid body 30 in the same manner as described above. The outer periphery of the carpeting 33 is outwardly protruding beyond the outer periphery of the lid body 30 at both side edges and at the rear edge of the lid 22 except the front edge. The lower surfaces of the protruded portions are detachably connected to the upper surfaces of the carpeting 29 on the rear floor panel 18 by a surface fastener 34. In FIG. 2, the carpetings 29 and 33 are shown in a partly cut-away manner.

By bending the reinforcing portion $30_1$ of the lid body 30 made of a steel plate in a J-shape in cross section, the rigidity of the lid 22 can be enhanced to prevent deformation caused by loads applied thereto. Furthermore, the rubber cushion 31 provided at the reinforcing portion $30_1$ of the lid body 30 lessens any shock at the time when the lid 22 is closed, and prevents development of a gap between the lid body 30 and the rear floor panel 18. Besides, since the carpeting 33 on the lid 22 is connected to the carpeting 29 on the rear floor panel 18 by the surface fastener 34, the two carpetings 29 and 33 are prevented from being turned up, and the appearance thereof can be improved.

A locking mechanism 36 having a grip 35 is provided at a rear portion of the lid 22 as shown in FIG. 5. The locking mechanism 36 is formed by a bracket 37 secured to the bottom surface of a recessed portion $30_2$ formed in the lid body 30, the grip 35 pivotally supported by the bracket 37 via a pin 38, a spring 39 for urging the grip 35 in the direction of an arrow B, a locking pawl 41 supported by the bracket 37 so as to slide back and forth and urged forwardly by a spring 40, and a striker 42 of the gate-type secured to the lid body 30.

When the lid 22 is closed, the locking pawl 41 forwardly urged by the spring 40 enters into the lower surface of the striker 42. Therefore, the locking pawl 41 is prevented from upwardly moving, and the lid 22 is locked at the closed position thereof. When the grip 35 is pulled upwardly by hand in the direction of an arrow A against the spring 39, a pushing portion $35_1$ of the grip 35 pushes a to-be-pushed portion $41_1$ of the locking pawl 41. Therefore, the locking pawl 41 moves backward against the spring 40. As a result, the locking pawl 41 separates away from the lower surface of the striker 42 and no longer engages with the striker 42, enabling the lid 22 to be opened. When the lid 22 is closed, an inclined surface $41_2$ formed at the front end of the locking pawl 41 comes in contact with the upper surface of the striker 42. Therefore, the locking pawl 41 moves backward against the spring 40, rides over the striker 42, and the locking mechanism 36 is automatically returned to the locked state.

The locking mechanism 36 is accommodated in the recessed portion $30_2$ of the lid body 30, and the grip 35 is fitted to the interior of a cut-away portion $22_1$ formed in the cushioning member 32 and in the carpeting 33 on the lid 22. Therefore, the grip 35 does not protrude beyond the surface of the lid 22 where it might come into contact with the feet of the passenger, or does not impair the appearance of the arrangement.

As shown in FIGS. 3 and 4, the lower cross member 16 including a portion of the upper wall of the trunk room 5 has an inclined surface $16_3$ which is gently inclined lower frontward from the flange $16_2$ at the rear side thereof. The inclined surface $16_3$ guides the spare tire T that is inserted in the trunk room 5 through the opening $18_1$ preventing interference between the spare tire T and the lower cross member 16. Furthermore, the upper cross member 15 has an inclined surface $15_3$ that is gently inclined upper frontward, and the rear part of the front floor panel 17 has an inclined surface $17_1$ which is gently inclined upper rearward toward the vertex of the inclined surface $15_3$ of the upper cross member 15. Therefore, the inclined surface $15_3$ of the upper cross member 15 and the inclined surface $17_1$ of the front floor panel 17 cooperate together to form the shape of a gentle peak, and their upper surfaces are covered with the cushion member 28 and the carpeting 29 concealing a small gap between the upper cross member 15 and the front floor panel 17. Therefore, a passenger who walks through the walk-through passage 4 is not caught at his feet by the gap.

As described above, the trunk room 5 is provided at a position surrounded by the pair of right and left side frames 7R, 7L extending in the longitudinal direction of the car body. Therefore, the rigidity of the car body is not reduced by the trunk room 5 and, besides, the upper wall of the trunk room 5 is formed by the cross member 10 which is connected at its right and left ends to the side frames 7R, 7L. Accordingly, the rigidity of the car body and the rigidity of the trunk room 5 are both enhanced.

Though the embodiment of the invention was described above in detail, it should be noted that the present invention can be modified in design in a variety of ways without departing from the gist and scope of the invention.

For example, the article to be contained in the trunk room 5 is not limited to the spare tire T only, but any article may be accommodated therein. The scope of the invention is indicated by the appended claims.

What is claimed is:

1. A floor structure of an automobile in which a trunk room is provided under a lower surface of a floor panel, and a lid is provided on the floor panel for opening and closing an opening of the trunk room, wherein said trunk room is disposed between a pair of right and left side frames arranged along the lower surface of the floor panel in a longitudinal direction of a body of the automobile, said lid is disposed between a front seat and a rear seat supported on an upper surface of the floor panel, and a portion of an upper wall of said trunk room is constituted by a cross member that extends in a lateral direction of the car body to connect said pair of right and left side frames together.

2. A floor structure of an automobile according to claim 1, wherein said lid is pivotally supported by said cross member.

3. A floor structure of an automobile according to claim 1, wherein said cross member is a closed cross-section member including an upper cross member having an open lower surface and front and rear flanges, and a lower cross member having an open upper surface and front and rear flanges, said front and rear flanges of the upper cross member are joined to said front and rear flanges of the lower cross member, a rear edge of the front floor panel is joined to the front flanges of said upper and lower cross members, and a front edge of the rear floor panel is joined to the rear flanges of the upper and lower cross members.

4. A floor structure of an automobile according to claim 3, wherein the opening of said trunk room is formed rearwardly of said cross member, and said lower cross member is provided with an inclined surface that is inclined lower frontward from the front edge of said opening.

5. A floor structure of an automobile according to claim 3, wherein said front floor panel is provided with an inclined surface which is inclined upper rearward toward a vertex of said upper cross member.

6. A floor structure of an automobile according to claim 5, wherein said upper cross member is provided with an inclined surface that is inclined upper frontward from the front edge of said opening toward a vertex of the inclined surface of said front floor panel.

7. A floor structure of an automobile according to claim 5, further including carpeting covering the upper surfaces of said front floor panel and of said cross member.

8. A floor structure of an automobile in which a trunk room is provided under a lower surface of a floor panel, and a lid is provided on the floor panel for opening and closing an opening of the trunk room, wherein said trunk room is disposed between a pair of right and left side frames arranged along the lower surface of the floor panel in a longitudinal direction of a body of the automobile, said lid is disposed between a front seat and a rear seat supported on an upper surface of the floor panel, the lid including a lid body made of a steel plate, a peripheral edge of the lid body being bent to form a reinforced portion, and said reinforced portion being provided with a rubber cushion that comes in contact with a peripheral edge of said opening.

9. A floor structure of an automobile according to claim 1, further including carpeting covering the upper surface of said lid and the upper surface of said floor panel, and a lower surface of an outer periphery of the carpeting extending toward an outer side beyond the outer periphery of the lid is secured, by a surface fastener, to an upper surface of the carpeting on the floor panel.

10. A combination of a floor structure and a passenger compartment of an automobile in which a trunk room is provided under a lower surface of a floor panel, and a lid is provided on the floor panel for opening and closing an opening of the trunk room, wherein said trunk room is disposed between a pair of right and left side frames arranged along the lower surface of the floor panel in a longitudinal direction of a body of the automobile, said lid is disposed between a front seat and a rear seat supported on an upper surface of the floor panel, one end of said lid being pivotally supported relative to said floor panel, a hook attached, via a wire, to another end of said lid opposite to the one end which is pivotally supported, and an engaging portion with which said hook engages is provided in said passenger compartment of the automobile.

11. A floor structure of an automobile according to claim 1, further including a grip for opening and closing said lid, said grip is accommodated in a recessed portion formed in said lid.

12. A floor structure of an automobile according to claim 1, wherein legs of the front seat are supported by said cross member.

13. A combination of a floor structure and a passenger compartment of an automobile, comprising:

a floor panel having a lower surface supported on a pair of right and left side frames extending in a longitudinal direction of a body of the automobile;

storage receptacle means disposed below said floor panel and between intermediate portions of the pair of right and left side frames;

said storage receptacle means including a receptacle body having an upper opening and a lid provided on the floor panel for selectively covering said upper opening, the lid being disposed between a front seat and a rear seat of the automobile supported on an upper surface of said floor panel;

one end of said lid being pivotally supported relative to said floor panel;

said storage receptacle means further including a hook attached, via a wire, to another end of said lid opposite to the one end which is pivotally supported; and an engaging portion with which said hook engages is provided in said passenger compartment of the automobile for maintaining the lid in an open position thereof.

14. A floor structure of an automobile, comprising:

a floor panel having a lower surface supported on a pair of right and left side frames extending in a longitudinal direction of a body of the automobile;

storage receptacle means disposed below said floor panel and between intermediate portions of the pair of right and left side frames:

said storage receptacle means including a receptacle body having an upper opening and a lid provided on the floor panel for selectively covering said upper opening, the lid being disposed between a front seat and a rear seat of the automobile supported on an upper surface of said floor panel;

a cross member extending in a transverse direction of the automobile body connecting the pair of right and left side frames together, a portion of the cross member including a portion of an upper wall of the receptacle body.

15. A floor structure of an automobile according to claim 14, wherein said lid is pivotally supported by said cross member.

16. A floor structure of an automobile according to claim 14, wherein the upper opening of said trunk body is formed rearwardly of said cross member, and a lower surface of said cross member is inclined lower frontward from the front edge of said opening.

17. A floor structure of an automobile, comprising:

a floor panel having a lower surface supported on a pair of right and left side frames extending in a longitudinal direction of a body of the automobile; and storage receptacle means disposed below said floor panel and between intermediate portions of the pair of right and left side frames;

said storage receptacle means including a receptacle body having an upper opening and a lid provided on the floor panel for selectively covering said upper opening, the lid being disposed between a front seat and a rear seat of the automobile supported on an upper surface of said floor panel;

the lid including a lid body made of a steel plate, a peripheral edge of the lid body being bent to form a reinforced portion, and said reinforced portion being provided with a rubber cushion that comes in contact with a peripheral edge of said upper opening.

18. A floor structure of an automobile according to claim 17, further including carpeting covering the upper surface of said lid and the upper surface of said floor panel, and a lower surface of an outer periphery of the carpeting extending toward an outer side beyond the outer periphery of the lid is secured, by a surface fastener, to an upper surface of the carpeting on the floor panel.

* * * * *

UNITED STATES PATENT AND TRADEMARK OFFICE
CERTIFICATE OF CORRECTION

PATENT NO : 6,145,907
DATED : 14 November 2000
INVENTOR(S) : Kazuhiko Maruyama, Yasuyuki Shibata, Gary Evert It is certified that error appears in the above-identified patent and that said Letters Patent are hereby corrected as shown below:

On the cover page, under "[56] References Cited", further under "U.S. PATENT DOCUMENTS", change "1,597,569 3/1926" to ­­1,597,569 8/1926­­.

Column 3, 9th line, change ".wherein the includes" to ­­wherein the structure includes­­.

Signed and Sealed this

Twenty-fourth Day of April, 2001

Attest:

NICHOLAS P. GODICI

*Attesting Officer*  *Acting Director of the United States Patent and Trademark Office*